United States Patent [19]

Diesing

[11] Patent Number: 5,045,024

[45] Date of Patent: Sep. 3, 1991

[54] HOLDING DEVICE FOR HOLDING POULTRY CARCASSES DURING PROCESSING

[75] Inventor: Karl-Heinz Diesing, Lübeck, Fed. Rep. of Germany

[73] Assignee: Nordischer Maschinenbau Rud. Baader GmbH + CO KG, Lübeck, Fed. Rep. of Germany

[21] Appl. No.: 533,340

[22] Filed: Jun. 5, 1990

[30] Foreign Application Priority Data

Jun. 6, 1989 [DE] Fed. Rep. of Germany ....... 3918345

[51] Int. Cl.[5] .............................................. A22C 21/00
[52] U.S. Cl. .................................... 452/185; 452/165; 269/48.1
[58] Field of Search ............... 452/185, 165; 269/48.1, 269/47, 48

[56] References Cited

U.S. PATENT DOCUMENTS

| 4,656,692 | 4/1987 | Vilemin et al. | 452/185 |
| 4,682,386 | 7/1987 | Hazenbroek et al. | 452/165 |
| 4,688,297 | 8/1987 | Bartels | 452/165 |
| 4,780,930 | 11/1988 | Sparkia | 452/185 |

Primary Examiner—Willis Little
Attorney, Agent, or Firm—Fay, Sharpe, Beall, Fagan, Minnich & McKee

[57] ABSTRACT

A holding device for holding gutted poultry carcasses or parts thereof for the purpose of processing during such treatment comprises a support body having a saddle horn, onto which body the poultry carcass, which is present in the shape of front halves or breast caps can be pushed. A clamping device, which can be activated manually or by means of the advance movement of the holding device brings about a secure holding by clamping the corpus sterni in its region between the coracoids by means of a clamping lever. This clamping lever is in an opening position during the loading action so as not to impede the latter.

20 Claims, 1 Drawing Sheet

HOLDING DEVICE FOR HOLDING POULTRY CARCASSES DURING PROCESSING

BACKGROUND OF THE INVENTION

1. Field of the Invention

The invention relates to a holding device for holding poultry pieces to be processed, which contain meat and bones in the form of gutted poultry carcasses or parts thereof for the purpose of processing and/or during such processing.

2. Prior Art

Numerous different constructions of such holding or retaining devices are known, which comprise a support body, onto which can be pushed the piece to be processed and which is equipped with a support surface supporting the piece at least on the inner contour of the breast bone or sternum, as well as controllable fixing means for fixing the piece to be processed.

For example, German patent 34 44 430 discloses a holding means in the form of a support block for receiving the carcasses of slaughtered poultry. Several of such support blocks are arranged on an endless conveyor driven in rotary manner, each support block carrying at its leading end, when seen in the conveying direction, a stop lug, behind which is fitted a holding pin movable in controlled manner from the support surface of the support block. This holding pin is kept retracted in the loading or feeding area of the device and immediately prior to the entry of the support block into the working area thereof it is controlled to move against the inside of the breastplate or corpus sterni, so that the holding pin penetrates the network of sinews or tendons located there and ensures a positive entrainment of the poultry carcass.

This holding means is only suitable for receiving breast caps, i.e. a poultry carcass portion from which the backbone area has been removed, so that saddling is possible. For the processing of unsaddlable front halves, i.e. portions which are obtained by an oblique cross-cut through the poultry body and which must be received in the neck opening the use of such a holding means is not possible.

EP-A-254 332 discloses a holding device for breast caps, which comprises a reception head with a hook-like abutment or stop element against which is movable a controlled holding pin passing out of the support surface. The breast cap is shoved against the stop element with the neck area first and with the corpus sterni engaging on the support surface, so that the stop element engages with its hook-like part over the corpus sterni in the area between the coracoids. The breast cap is then fixed by the holding pin, which penetrates the network of sinews located in this area and brings about a clamping action.

Such clamping mechanism also exists in a modified construction of the known holding device, in which the reception head is constructed in horn-like manner, so that it is possible to hold front halves of poultry.

However, the main drawbacks of these known structures are that the loading process is complicated and therefore time-consuming, because the front halves must first be inverted over and then retracted again for fixing purposes until the corpus sterni with its leading edge located between the coracoids engages on the holding means of the stop element. Another disadvantage of this construction is that the carcass remaining on the holding device after processing can only be removed in an equally complicated manner.

SUMMARY OF THE INVENTION

The main object of the present invention is to propose a holding device which can be easily loaded and which is universally usable, i.e. for random starting products.

It is a further important object of the present invention to enable an exact positioning, so as to permit a precise mechanical processing and/or gaining of meat at maximum yield.

In a supporting device comprising a support body, onto which can be pushed the piece to be processed and which is equipped with a support surface supporting the piece at least on the inner contour of the breastbone or sternum, as well as controllable fixing means for fixing the piece to be processed, these objects are achieved according to the invention, in that the fixing means comprise a clamping mechanism constituted by a clamping lever movable against the support body and which in its active position forms a stop or abutment gripping behind the piece to be processed counter to the loading direction.

The advantages resulting therefrom are in particular that this clamping mechanism in the deactivated position allows an unhindered loading of the support body, brings about an automatic positioning and ensures a reliable fixing.

According to a preferred embodiment the clamping mechanism can be provided with a clamping lever, which is pivotably mounted about an axis located below the support surface of the support body and is shaped as a ring segment, whose free end forms the clamping face of the clamping lever and whose other end is connected to a crank lever. Positioning appropriately takes place in that the inner contour of the ring segment is in the form of a segment of a spiral, whose centre is the crank lever's axis. A wider support base may be obtained on the positioning abutment if the clamping lever comprises two juxtaposed ring segments united in the vicinity of the clamping face.

The crank lever may be connected to a toggle lever mechanism which is operable by external action. This has the advantage that the clamping device is self-holding in the activated state. Through constructing the opposite pole of the clamping face of the clamping lever as the front face of a bolt, which projects out of the support face of the support body and is displaceably guided against the tension of a spring, the holding force can be kept within predetermined limits independently of the particular size of the poultry carcass or piece to be held.

In order to simplify the manufacture of the holding device the fixing means can be housed in a narrow casing, to which the support body may be fixed in an inverted manner.

A hygienically advantageous construction is obtained if the support body is mounted on a base plate to which it can be connected by means of a fast or snap closure device releasable without the aid of any tool. Thus, it is possible to easily remove the support body for cleaning purposes and, if necessary, place and store it in a cleaning liquid.

For continuous processing purposes, the base plate can be fixed with others on an endless conveyor driven in rotary manner and along the path of the holding device can be provided fixed control means for operating the toggle lever mechanism.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
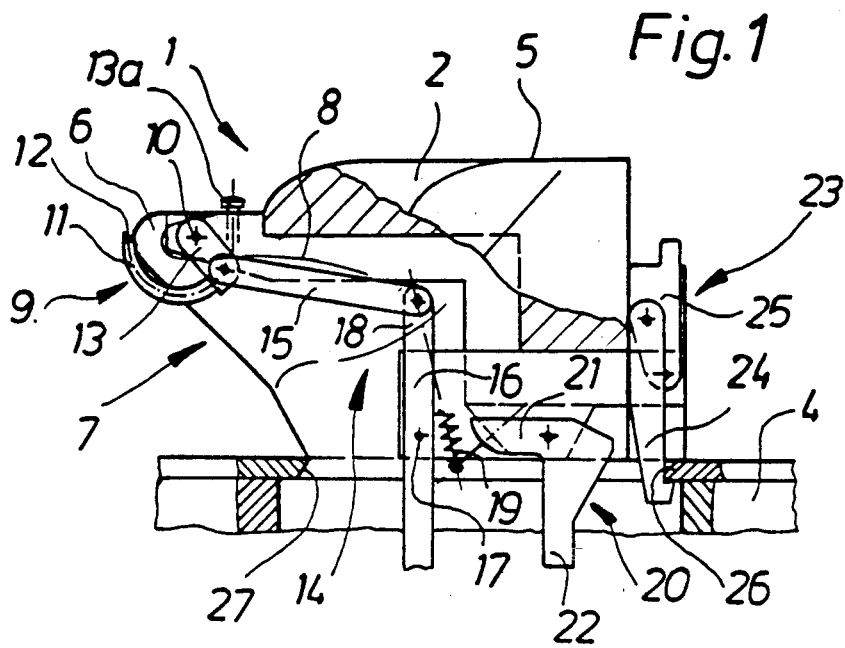
FIG. 1 shows a side view of a support body with an incorporated clamping device, in partly sectional form and in a deactivated state.
Figures 2, 3:
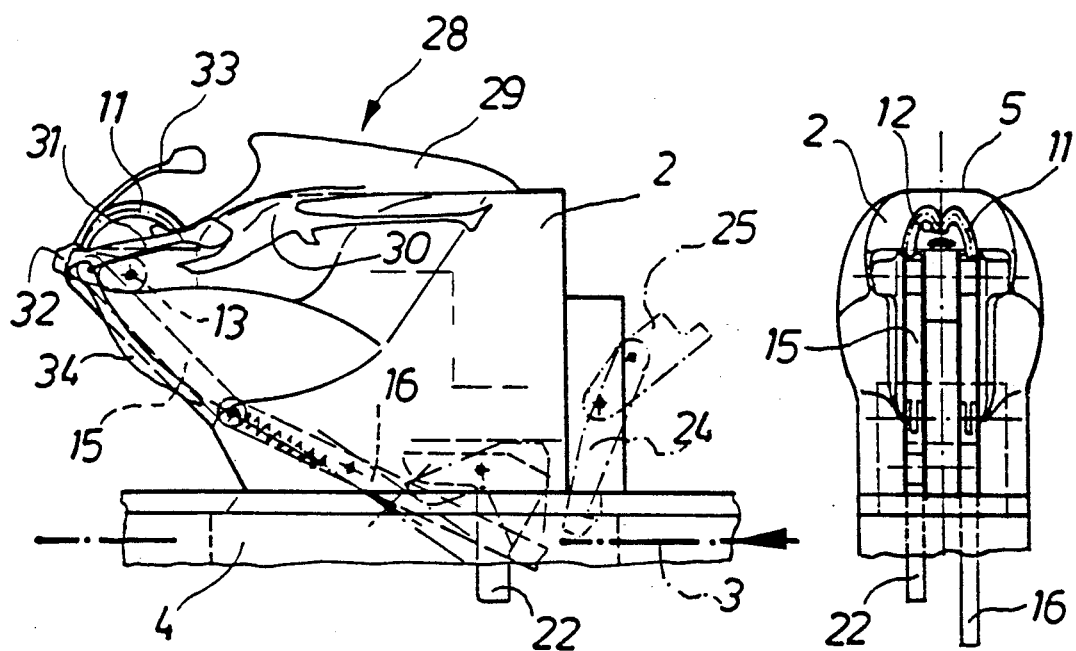
FIG. 2 represents support body corresponding to FIG. 1 with an activated clamping mechanism and a saddled poultry carcass portion.
FIG. 3 shows a front view of the support body.

A holding device 1 according to the invention comprises a support body 2, which is fixed to a base plate 4 located on an endless conveyor 3. The base plate 4 is guided in an appropriate manner in a not shown machine frame, in which the conveyor 3 is mounted in rotary manner with horizontal orientation of its working run and in a vertical plane. The support body 2 is shaped like a saddle and is equipped with a support face 5 and a saddle horn 6 pointing in the conveying direction of said conveyor 3. The support body 2 is substantially U-shaped, so that it is able to receive a compact, preassembled clamping device or mechanism 7 having a casing 8, to which is appropriately fixed the support body 2.

The clamping device 7 comprises a clamping lever 9 arranged in the area of the saddle horn 6 and which is pivotably mounted about an axis 10 located below the support face 5 of the support body 2 and oriented transversely to the longitudinal axle thereof. At its free end the clamping lever 9 has a clamping face 12. The lever 9 comprises two juxtaposed ring segments 11 joined together in the region of the clamping face 12, while its other ends are connected to a crank lever 13. In the clamping position a bolt 13a faces the clamping face 12 of the clamping lever 9 to form an opposite pole thereto. This bolt projects out of the support face 5 and can be forced back into the support body 2 counter the force of a not shown spring.

The crank lever 13 is associated with a toggle lever mechanism 14. This comprises a lever 15, which couples in an articulated manner the free end of the crank lever 13 to a free end of a two-armed operating lever 16. This lever 16 is pivotably mounted in the vicinity of the base plate 4 about an axle 17 positioned transversely to the longitudinal axis of the support body 2, whereas its other free end 18 projects out of the base plate 4. The articulated connections between the crank lever 13 and the lever 15, as well as between the latter and the operating lever 16 are so positioned with respect to the axle 17 of the latter, that in the clamping position of the clamping lever 9 they slightly pass beyond a stretched position, i.e. a position in which said articulated connections are located on a straight connecting line. A tension spring 19 acting on the connection between the lever 15 and the operating lever 16 secures both the clamping position and the opening position of the clamping device 7. A free end 21 of a release lever 20, which is constructed as an angle lever can come into contact with the operating lever 16 in the stretched position, whilst the other free end 22 projects out of the base plate 4.

The support body 2 is detachably connected to the base plate 4 by a fast connection. The latter comprises a bayonet joint 23 located on the trailing end of the support body 2 and comprising a ratchet lever 24 and a tensioning lever 25. In the fastening position the ratchet lever 24 engages below a projection 26 in the base plate 4, in which position a self-holding takes place. The front end of the support body 2 is provided with a nose 27 which may be inserted into a corresponding recess in the base plate 4.

For putting the holding device 1 into operation, with the bayonet joint 23 released and with a slight slope, said device is inserted in a corresponding opening of the base plate 4 with the saddle horn 6 leading in the conveying direction until the nose 27 abuts. The holding device 1 is then lowered at the rear end, so that the ratchet lever 24 of the bayonet joint 23 also projects into an opening of the base plate 4. When the support body 2 rests on the base plate 4, the tensioning lever 25 of the bayonet joint 23 is moved against the support body 2, so that the ratchet lever 24 engages below the projection 26 in the base plate 4 and therefore connects the latter to the support body 2. Onto the latter is now saddled a poultry carcass 28 in such a way that its sternum 29 points upwards, i.e. comes to rest with the inner face of the corpus sterni 30 on the support face 5 of the support body 4 and the saddle horn 6 projects out of the neck area. Thus, the coracoids 31 with the poultry body joints 32 of the poultry's wings point forward, which are followed by the clavicula or wish bone 33 and the shoulder blades or scapulae 34. Said saddling operation is possible in an unhindered manner, because the clamping device 7 is in the open position (FIG. 1) within the loading area of a machine using said holding device. As a result of the advance of the support body 2, after leaving the loading area, the free end 18 of the operating lever 16 comes into contact with and engages not shown, frame-fixed control means, which bring about a pivoting of the operating lever 16 into the stretched position of the toggle lever mechanism. As a result, the clamping lever 9 is pivoted into its clamping position and the corpus sterni is fixed in its end region between the coracoids 31 between the clamping face 12 of the clamping lever 9 and its opposite pole, namely the bolt 13a. Prior to reaching the clamping position, the arrangement of the inner contour of the ring segments 11 of the clamping lever 9 on a spiral path with respect to the axle 10 has led to the poultry carcass 28 being further pushed onto the support body 2 with increasing emergence of the clamping lever 9. Thus, the fixing of the poultry carcass 28 takes place once the saddle horn 6 is engaged in the bend or curvature between the shoulder blades 34 and the body joints 32, so that in each case there is a size-independent positioning with respect to this point. The poultry carcass 28 is released by the free end of the release lever 20 engaging with also not shown, frame-fixed control means, which action has the effect that the toggle lever mechanism 14 is forced out of the stretched position and the clamping lever 9 is brought into the open position.

At the end of use of the holding device 1, the latter can be easily released from its base plate 4 without the assistance of tools, in that the tensioning lever 25 is pressed off the support body 2. Thus, thorough cleaning thereof is possible in an easy manner by storing in a cleaning liquid.

It is pointed out that the holding device 1 according to the invention can obviously be connected in a random manner to a conveyor.

What is claimed is:

1. In a machine for processing gutted poultry carcasses, a device for holding at least parts of such carcasses to be processed containing meat and bones including the breastbone (sternum), said device comprising
    a) a support body adapted to receive one of said parts to be processed by said part being pushed onto said support body in a pushing direction;
    b) a support face arranged on said support body for supporting said part at least on the inner contour of said breastbone; and
    c) controllable fixing means for fixing said part to be processed, which fixing means comprise a clamping device formed by a clamping lever adapted to move against said support body and which lever in its active position forms an abutment gripping behind said part to be processed counter to said pushing direction.

2. A holding device as claimed in claim 1, wherein said controllable fixing means include a crank lever and wherein said clamping lever is pivotably mounted about an axis located below said support face of said support body and is in the form of at least one ring segment, whose free end forms a clamping face of said clamping lever and whose other end is connected to said crank lever.

3. A holding device as claimed in claim 2, wherein the inner contour of said ring segment is in the form of a segment of a spiral, whose centre is said axis.

4. A holding device as claimed in claim 2, wherein said clamping lever comprises two juxtaposed ring segments joined in the region of said clamping face.

5. A holding device as claimed in claim 2, wherein a toggle lever mechanism is provided, which is arranged to be operated by external action, and wherein said crank lever is connected to said toggle lever mechanism.

6. A holding device as claimed in claim 1, wherein said device includes a bolt, which projects out of said support face of said support body and is displaceably guided counter to the tension of a spring, and wherein said clamping lever is adapted to cooperate with an end face of said bolt.

7. A holding device as claimed in claim 2, wherein said device includes a bolt, which projects out of said support face of said support body and is displaceably guided counter to the tension of a spring, and wherein an opposite pole to said clamping face is formed by an end face of said bolt.

8. A holding device as claimed in claim 1, wherein said holding device includes a narrow casing for housing said fixing means, to which casing said support body is fixed in an inverted-over manner.

9. A holding device as claimed in claim 2, wherein said holding device includes a narrow casing for housing said fixing means, to which casing said support body is fixed in an inverted-over manner.

10. A holding device as claimed in claim 5, wherein said holding device includes a narrow casing for housing said fixing means, to which casing said support body is fixed in an inverted-over manner.

11. A holding device as claimed in claim 6, wherein said holding device includes a narrow casing for housing said fixing means, to which casing said support body is fixed in an inverted-over manner.

12. A machine for processing at least parts of gutted poultry carcasses, which parts to be processed contain meat and bones including the breastbone (sternum), said machine comprising
    a) at least one base plate arranged to move in said machine; and
    b) at least one holding device for holding one of said parts to be processed and including
        ba) a support body adapted to receive one of said parts to be processed by said part being pushed onto said support body in a pushing direction;
        bb) a support face arranged on said support body for supporting said part at least on the inner contour of said breastbone; and
        bc) controllable fixing means for fixing said part to be processed, which fixing means comprise a clamping device formed by a clamping lever adapted to move against said support body and which in its active position forms an abutment gripping behind said part to be processed counter to said pushing direction,
wherein said at least one base plate is arranged to receive said at least one holding device by mounting the latter in said at least one base plate through attachment thereto by means of a fast closure device releasable without the aid of tool.

13. A machine as claimed in claim 12, which machine further comprises
    c) endless conveyor means driven to move in a rotary manner in said machine along a conveying path and carrying said at least one base plate;
    d) machine-fixed control means positioned along said conveying path for operating said fixing means in a controlled manner such as to move said clamping lever into and out of said active position for respectively fixing and releasing said part to be processed.

14. A machine as claimed in claim 13, wherein said controllable fixing means include a crank lever designed to be operated by said control means, and wherein said clamping lever is pivotably mounted about an axis located below said support face of said support body and is in the form of at least one ring segment, whose free end forms a clamping face of said clamping lever and whose other end is connected to said crank lever.

15. A machine as claimed in claim 14, wherein said holding device includes a toggle lever mechanism, which is arranged to be operated by said control means, and wherein said crank lever is connected to said toggle lever mechanism.

16. A machine as claimed in claim 12, wherein said device includes a bolt, which projects out of said support face of said support body and is displaceably guided counter to the tension of a spring, and wherein said clamping lever is adapted to cooperate with an end face of said bolt.

17. A machine as claimed in claim 14. wherein said device includes a bolt, which projects out of said support face of said support body and is displaceably guided counter to the tension of a spring, and wherein an opposite pole to said clamping face is formed by an end face of said bolt.

18. A machine as claimed in claim 12, wherein said holding device includes a narrow casing for housing said fixing means, to which casing said support body is fixed in an inverted-over manner.

19. A machine as claimed in claim 14, wherein said holding device includes a narrow casing for housing said fixing means, to which casing said support body is fixed in an inverted-over manner.

20. A machine as claimed in claim 16, wherein said holding device includes a narrow casing for housing said fixing means, to which casing said support body is fixed in an inverted-over manner.

* * * * *